United States Patent [19]

Stein

[11] Patent Number: 5,547,367

[45] Date of Patent: Aug. 20, 1996

[54] MECHANISM FOR CLOSING A MOLD IN PLASTIC INJECTION-MOLDING MACHINERY THAT ACCOMMODATES A LARGE AND HEAVY MOLDING TOOL

[75] Inventor: Walter Stein, Schwerin, Germany

[73] Assignee: Heimscheidt Maschinentechnik Schwerwin GmbH & Co., Schwerin, Germany

[21] Appl. No.: 382,537

[22] Filed: Feb. 2, 1995

[30] Foreign Application Priority Data

Feb. 2, 1994 [DE] Germany ............... 44 03 079.7

[51] Int. Cl.[6] .................................................. B29C 45/64
[52] U.S. Cl. .............. 425/589; 100/46; 100/258 A; 425/408; 425/409; 425/450.1; 425/451.9; 425/590; 425/595
[58] Field of Search .................. 100/46, 258 A, 100/258 R, 918; 425/168, 406, 408, 409, 450.1, 451, 451.2, 451.9, 589, 590, 595

[56] References Cited

U.S. PATENT DOCUMENTS 5,354,196 10/1994 Ziv-Av ............................ 425/589
5,356,279 10/1994 Fuller et al. ...................... 425/589
5,399,083 3/1995 Wollschlager ................... 425/589

Primary Examiner—Tim Heitbrink
Attorney, Agent, or Firm—Cohen, Pontani, Lieberman & Pavane; Christa Hildebrand

[57] ABSTRACT

A mechanism for closing a mold in plastic injection-molding machinery that accommodates a large and heavy molding tool (5). One stationary chuck (2) rests machinery's base (1), while another chuck (3) travels on a longitudinally movable carriage (4). Each chuck (2,3) accommodates one half of the mold (5) and is aligned by poles (6) which can extend through the chucks. The carriage has a number of bearing sites (4.4) mounted on its bottom surface proximate to its corners. Suspension crossarms (10.2, 14.2) are rotatably mounted to the bearing sites (4.4). The rear suspension crossarms (10.2, 14.2) are mounted using a shaft (11) which has two eccentric portions (11.1) with opposite eccentricities. The non-eccentric portions (11.2) of the shaft are connected to one another by a torsion rod (12) and are rotatably mounted in the bearing sites (4.4). The rear suspension crossarms (10.2, 14.2) are rotatably mounted on the eccentric portions (11.1) of the shaft (11). Rocking shoes (10.1, 14.1) are mounted, preferably rotatably, to each of the suspension crossarms (10.2, 14.2), preferably in a calotte joint. The rocking shoes (10.1, 14.1) ride on rails of the base (1) of the apparatus.

13 Claims, 16 Drawing Sheets

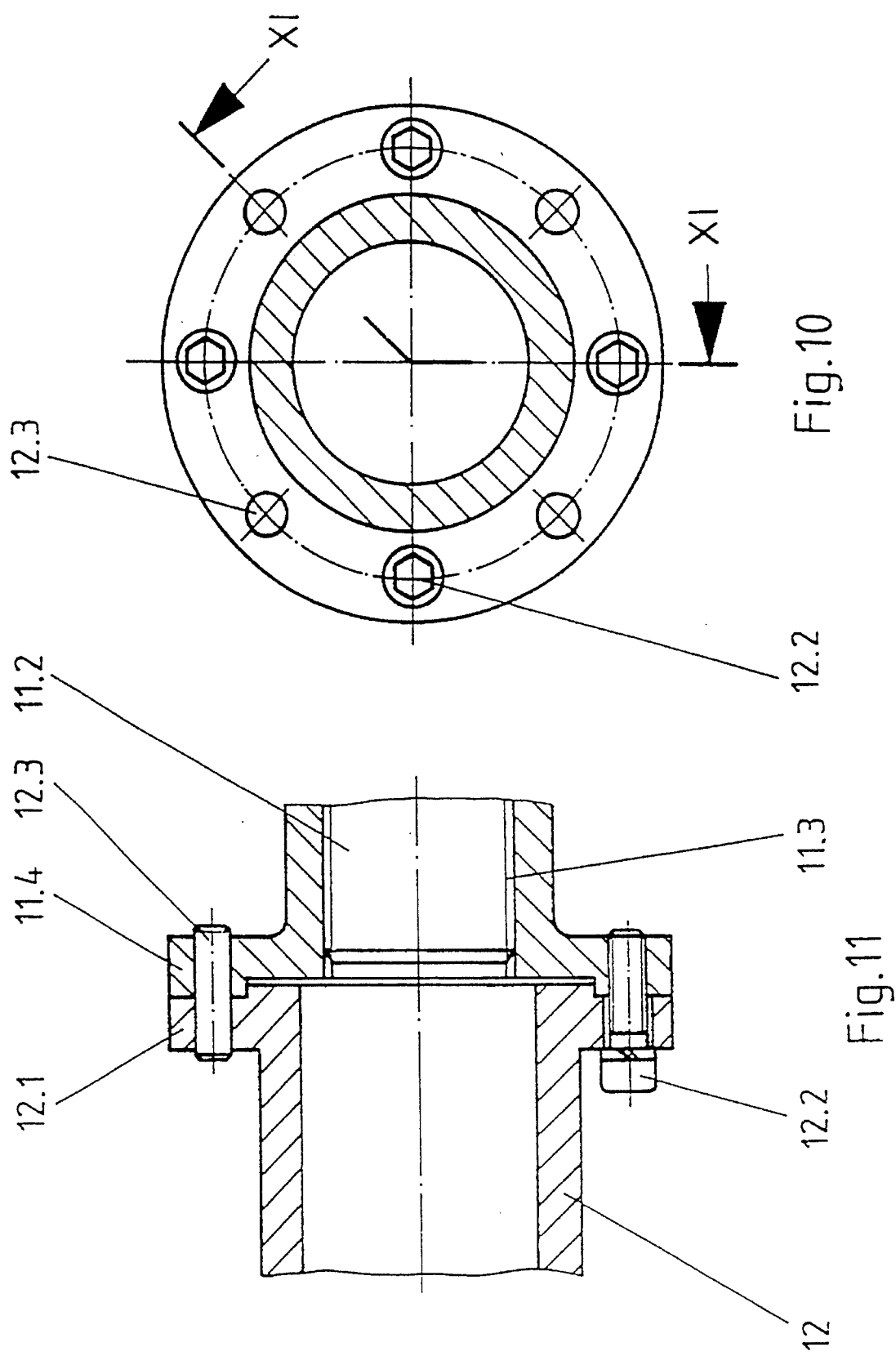

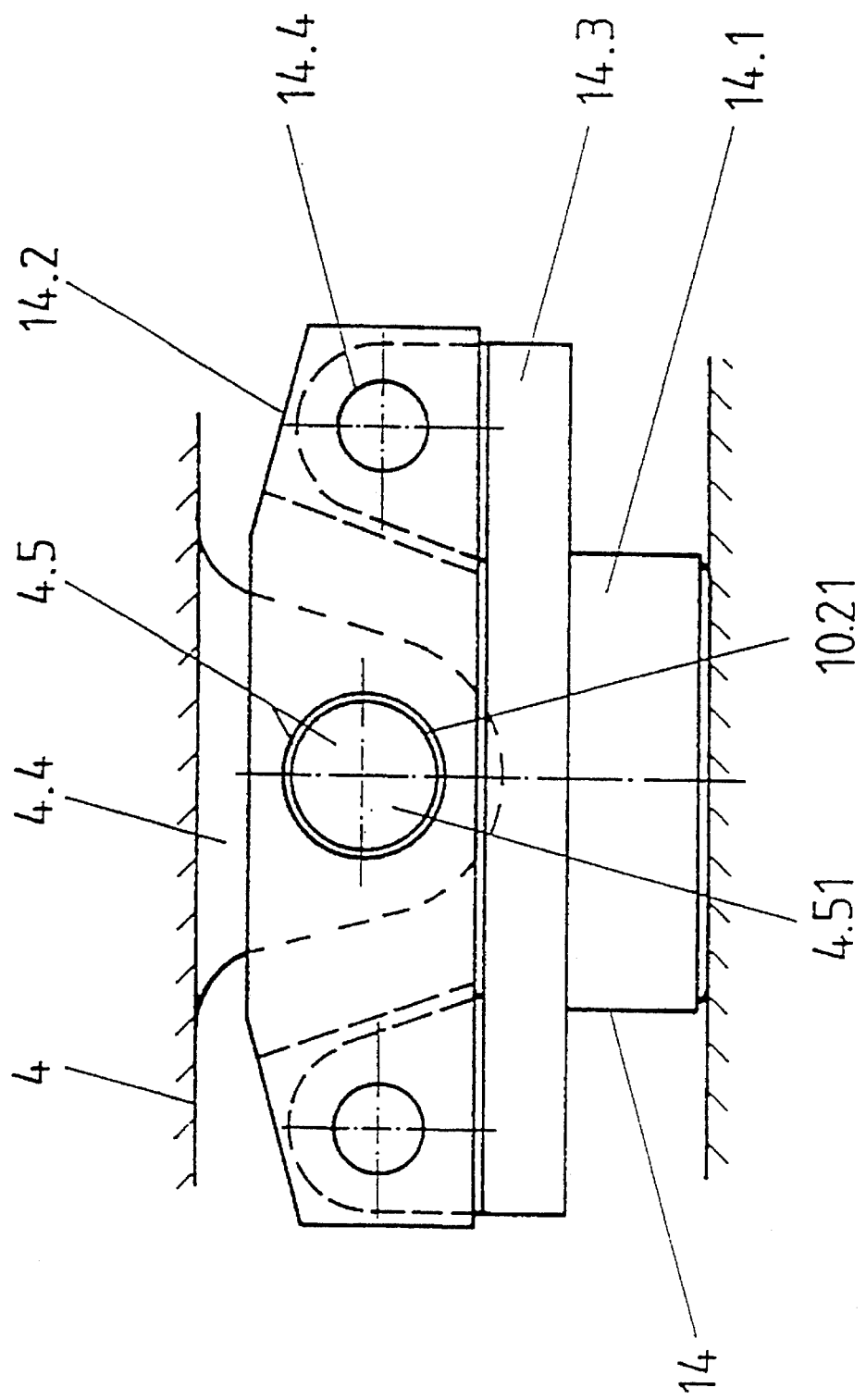

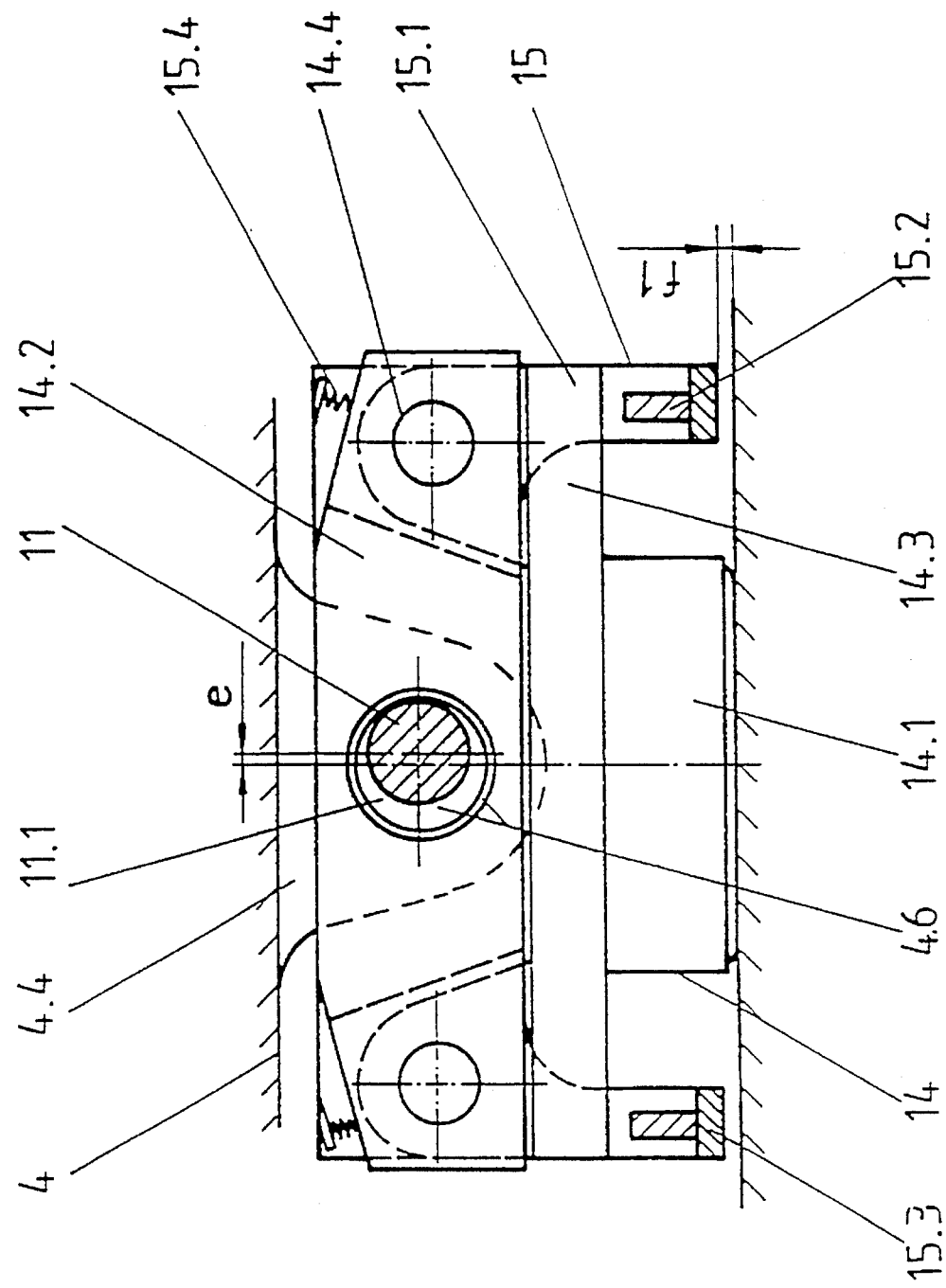

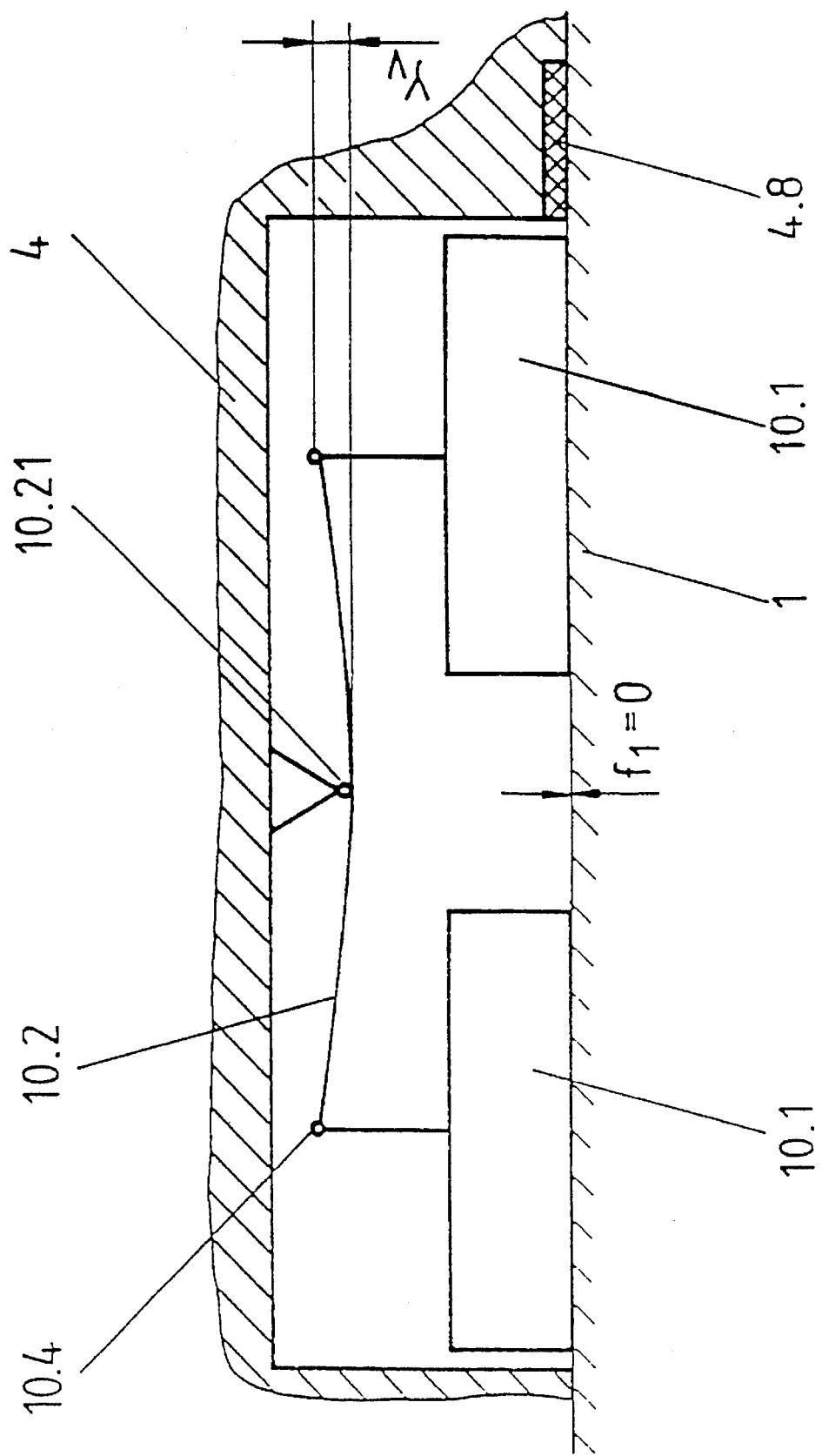

$y_H = y_{H_1} + y_{H_2}$

1

MECHANISM FOR CLOSING A MOLD IN PLASTIC INJECTION-MOLDING MACHINERY THAT ACCOMMODATES A LARGE AND HEAVY MOLDING TOOL

FIELD OF THE INVENTION

The present invention relates to a mechanism for closing a mold in plastic injection-molding machinery that accommodates a large and heavy molding tool.

Mechanisms for closing molds in plastic injection-molding machinery can weigh as much as 130 metric tons. Such tools typically have two chucks. One chuck is stationary and rests on the machinery's base. The other chuck travels on the carriage. The carriage consists of a platform on two runners. The carriage shuttles back and forth along the base on rocking-shoe holders and rails. Each chuck accommodates one half of the mold and is typically maintained in alignment by poles. The alignment poles can extend all the way through the chucks or be unsupported at their outer end. The height of the poles can be varied by a tool-height adjustment mechanism to conform to the overall height of the tool. The two halves of the mold are brought together and are separated by advancing and retracting the traveling chuck into the closed or open position by means of one or more rapid-action cylinders. Clamping-and-stabilizing and cleaving forces are exerted on the mold in that state by mold locking-and-unlocking cylinders. Typical embodiments of such a mechanism are described in German Patent document Nos. 3 145 973 C1 and OS 1 931 432 and Japanese Patent Abstract No. 2 241 715-A. The traveling chuck described in German Patent document No. 3 145 973 C1 rests laterally and vertically on rollers accommodated in angle irons in cassettes. Every supporting mechanism comprises a lateral and a vertical roller group accommodated in a holder. They can be adjusted to the rails by means of screws. German Patent document No. OS 1 931 432 discloses a rocking-shoe holder that compensates the variously effective forces normal to the open and closed tool by means of variable countervailing forces exerted by springs or piston-and-cylinder mechanisms. Japanese Abstract No. 2 241 715-A describes a similar rocking-shoe holder incorporating a roller-bearing support that accommodates the various vertical forces. There are additional means of adjusting the alignment poles to various loads exerted by the halves of the mold to a flection f of approximately 0 to prevent deviations in parallelism between the two chucks.

The disadvantage of all known rocking-shoe holders is that they can be loaded only up to the permissible load-bearing factor of the individual rollers. Three different load situations, however, occur in injection-molding practice wherein the rocking-shoe holders must be designed specifically to resist the heaviest loads. The lightest load on the rocking-shoe holders is present when the traveling chuck is in the static phase of the operation, with the mold open. During the dynamic phase of the operation, while the traveling chuck is being advanced or retracted along with the halves of the mold into the open and closed positions, the load will increase due to acceleration. The forces exerted on the rocking-shoe holders on the other hand will be most powerful while the molding tool's chucks and mold halves are closed and mold-clamping or mold-cleaving forces are being exerted on the tool. During this phase of the operation, any deviations from parallelism on the part of the facing edges of the tool's mold halves due to slight differences in weight or shape must be compensated for with additional forces. Such additional forces must also be accommodated by the rocking-shoe holders. Roller-pavement loads can reach 130 tons based upon the inherent weight of the traveling-chuck carriage, the traveling chuck, and the molding tool. These loads will be approximately 40% to 50% heavier than those of the rocking-shoe holders during either the static or the dynamic phase while the mold-closing machinery is in the open state. Rocking-shoe holders are either very expensive or impossible to procure at all for such extreme differences in load.

SUMMARY OF THE INVENTION

The object of the present invention is accordingly to provide a load-balancing mechanism and a load-limiting mechanism for a traveling-chuck carriage that has rocking-shoe holders at its four corners and accommodates higher loads during the static phase of the operation while the molding tool is closed than during the static phase of the operation while the molding tool is open or during the dynamic phase of the operation. The load-balancing mechanism and load-limiting mechanism relieves the rocking-shoe holders during the static phase of operation while the molding tool is closed and ensures highly reliable support for the carriage at a minimum of points.

In accordance with the present invention, a bearing site extends through the middle of a suspension crossarm at each corner, and a holder accommodating standard rocking shoes pivots longitudinally and transversely at each end of the crossarm in a friction bearing accommodating a calotte joint. One or several shoes, preferably in a row, can be accommodated in the crossarm depending on how heavy the load is. The forward rocking-shoe suspension crossarms, which are on the end of the carriage facing the stationary molding-tool chuck, pivot directly in friction bearings on the lower edge of the carriage runners, whereas the crossarms to the rear of the traveling chuck pivot around an eccentric section of a rotating shaft. A non-eccentric section on each side of the eccentric section on each shaft is located toward the longitudinal central axis of the traveling-chuck carriage and is rigidly connected by a torsion rod so that the eccentricity of one opposes that of the other along the horizontal plane. The non-eccentric sections on each side of the eccentric section are mounted in friction bearings in each of the traveling-chuck carriage runners. A carriage-supporting frame pivots on each end of each rocking-shoe suspension crossarm on each eccentric section. Pressure-accommodation disks are located on the bottom of each frame, rest on the machinery's base, and are attached to the crossarms by springs that accommodate the tilting moment that occurs while the carriage is being accelerated or decelerated. Other pressure-accommodation disks located on the bottom of the runners provide static support. In accordance with another embodiment of the present invention, other pressure-accommodation disks located on the bottom of the traveling-chuck carriage runners are located proximate to the center of gravity of the mass being displaced and at the front of the carriage where they can relieve the rocking-shoe holders. When several rocking shoes are accommodated in a row in the rocking-shoe suspension crossarms in this embodiment, each shoe can be accommodated at the center of a calotte joint. However, when the load is light and the shoes are accommodated individually in the crossarms, each end of a shoe can pivot longitudinally and transversely in a calotte joint.

The present invention has many advantages. When the traveling-chuck carriages are very large and heavy and must accommodate as much as 50% more vertical force during an extreme static phase of operation, the existing rocking-shoe holders will be protected by the load-limiting mechanism. Again, when the carriages, molding-tool chucks, and molding-tool mold halves are large and heavy, any irregularities and deviations in mass at the facing edges of the mold halves during the static and mold-open phase of the operation and during the dynamic phase of the operation will be compensated by the load-balancing mechanism to the extent that the rocking-shoe holders will always be securely supported at the four corners of the carriage while the traveling chuck is maintained absolutely level. The present invention also allows the use of rocking shoes whereby only the forces deriving from the dynamic phase of the operation must correspond to the permissible load capacity. The load-balancing mechanism and load-limiting mechanism accordingly prolongs the life of the rocking-shoe holder. The mechanism is also inexpensive to manufacture.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

In the drawings, wherein like reference numerals delineate similar elements throughout the several views:

FIG. 10 is a section through the torsion rod along the line X—X in FIG. 8;

FIG. 11 is a section through the torsion rod along the line XI—XI in FIG. 10;

FIG. 12 illustrates the forward crossarm with a rocking shoe;

FIG. 13 illustrates the rear crossarm with a rocking shoe;

FIG. 14 illustrates loads on the forward rocking-shoe holder with the molding tool tensioned;

DETAILED DESCRIPTION OF THE PRESENTLY PREFERRED EMBODIMENTS

Figure 1:
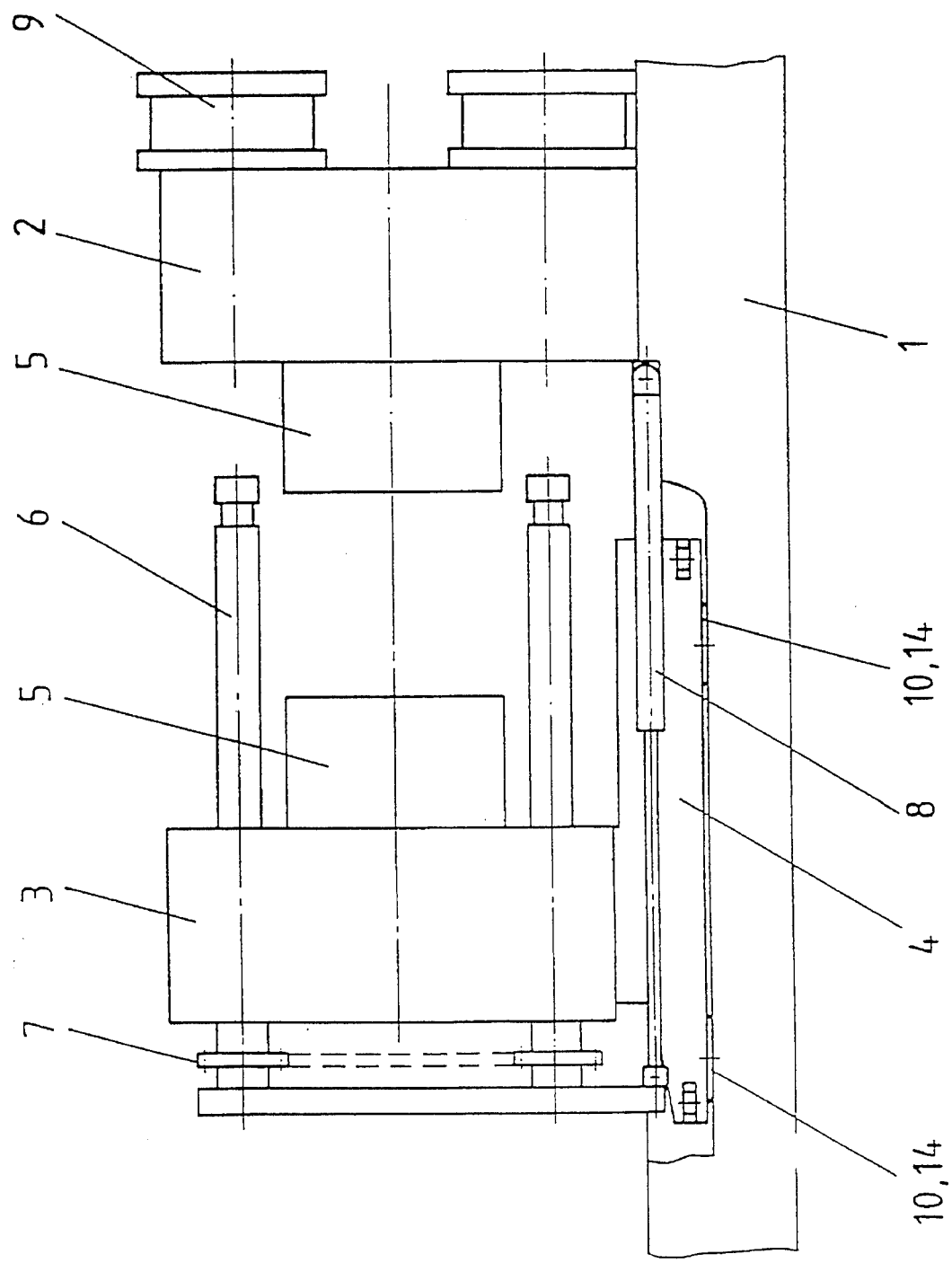
FIG. 1 illustrates mold-closing machinery with an open molding tool.
Figure 2:
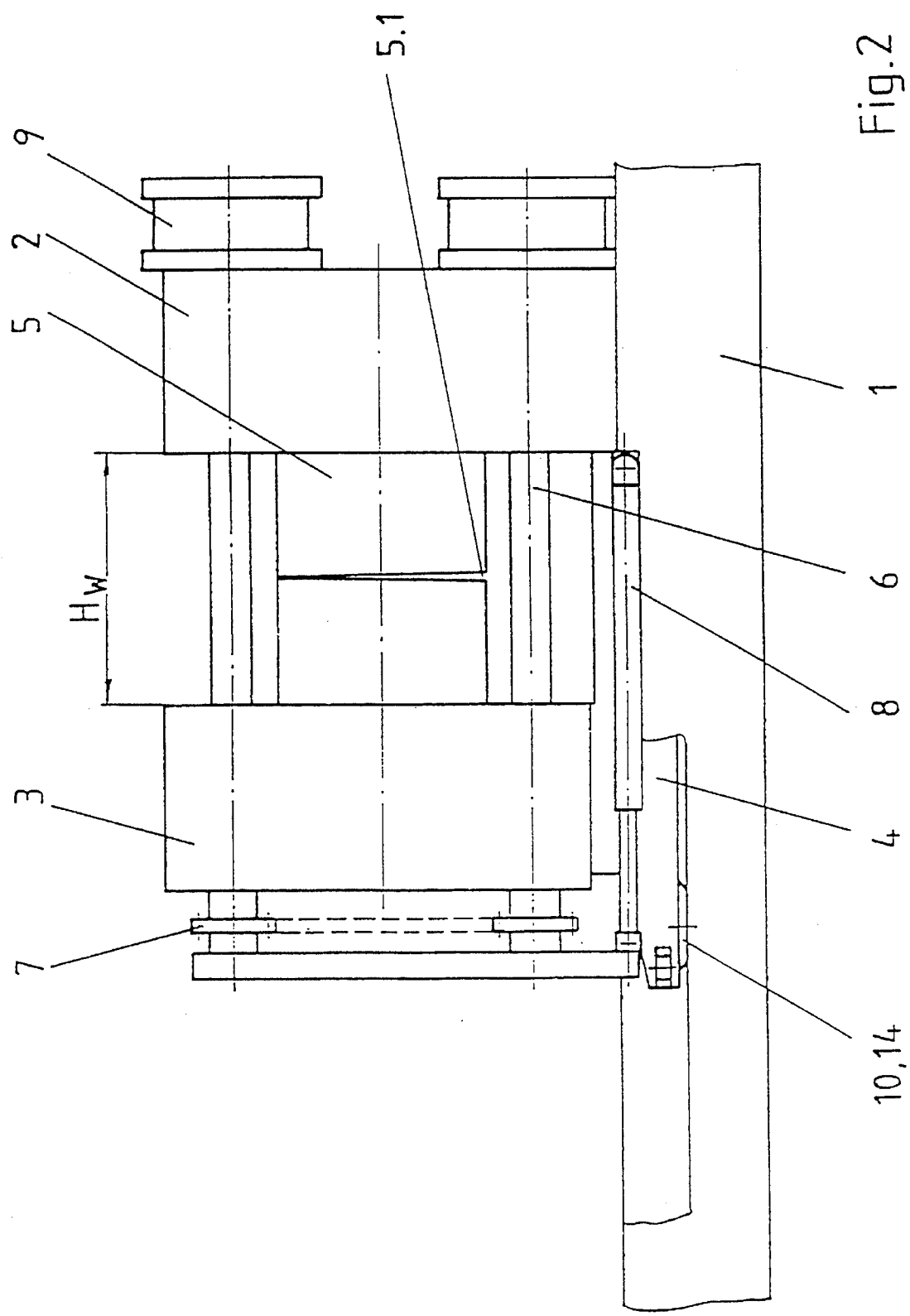
FIG. 2 illustrates the same machinery with the molding tool closed.

FIGS. 1 and 2 illustrate the basic structure of a mold-closing mechanism in plastic injection-molding machinery. The injection-molding machinery itself is not shown. The mechanism comprises a stationary molding-tool chuck 2 and a traveling molding-tool chuck 3. Stationary chuck 2 is mounted on a base 1. Traveling chuck 3 is mounted on a carriage 4. Carriage 4 comprises, as will be particularly evident from FIG. 3, two runners 4.1 connected by a platform 4.2. The carriage travels longitudinally back and forth on the runners 4.1 along rails (not shown). Referring again to FIGS. 1 and 2, each chuck 2, 3 accommodates half of a molding tool 5. The two chucks 2, 3 are connected by unsupported alignment poles 6. Alignment poles 6 are raised and lowered to the height $H_w$ of the molding tool by a height adjustment mechanism 7. Tool 5 is opened and closed by advancing and retracting traveling chuck 3 on carriage 4 by means of one or more rapid-action cylinders 8. Once tool 5 is closed, as shown in FIG. 2, it is locked by any conventional means (not shown), and mold-clamping and mold-cleaving forces are applied by mold locking-and-unlocking cylinders 9. The facing edges of the two halves of the mold are not parallel, and a wedge-shaped gap 5.1, exaggerated in FIG. 2, is left between them. Gap 5.1, which derives from irregularities in the flatness of the delivery surface and from differences in weight, must be eliminated by the mold-clamping force exerted by mold locking-and-unlocking cylinders 9. Up to 50% more vertical force might be needed to position the facing edges of the mold parallel than occurs during the static operating phase when the mold is open. When the tool is very large and heavy, these forces either can no longer be accommodated by rocking-shoe holders 10, 14 or will lead to premature wear. The rocking-shoe holders 10, 14 are relieved in accordance with the present invention by a load-limiting mechanism during the phase when the load is heaviest.

Figure 3:
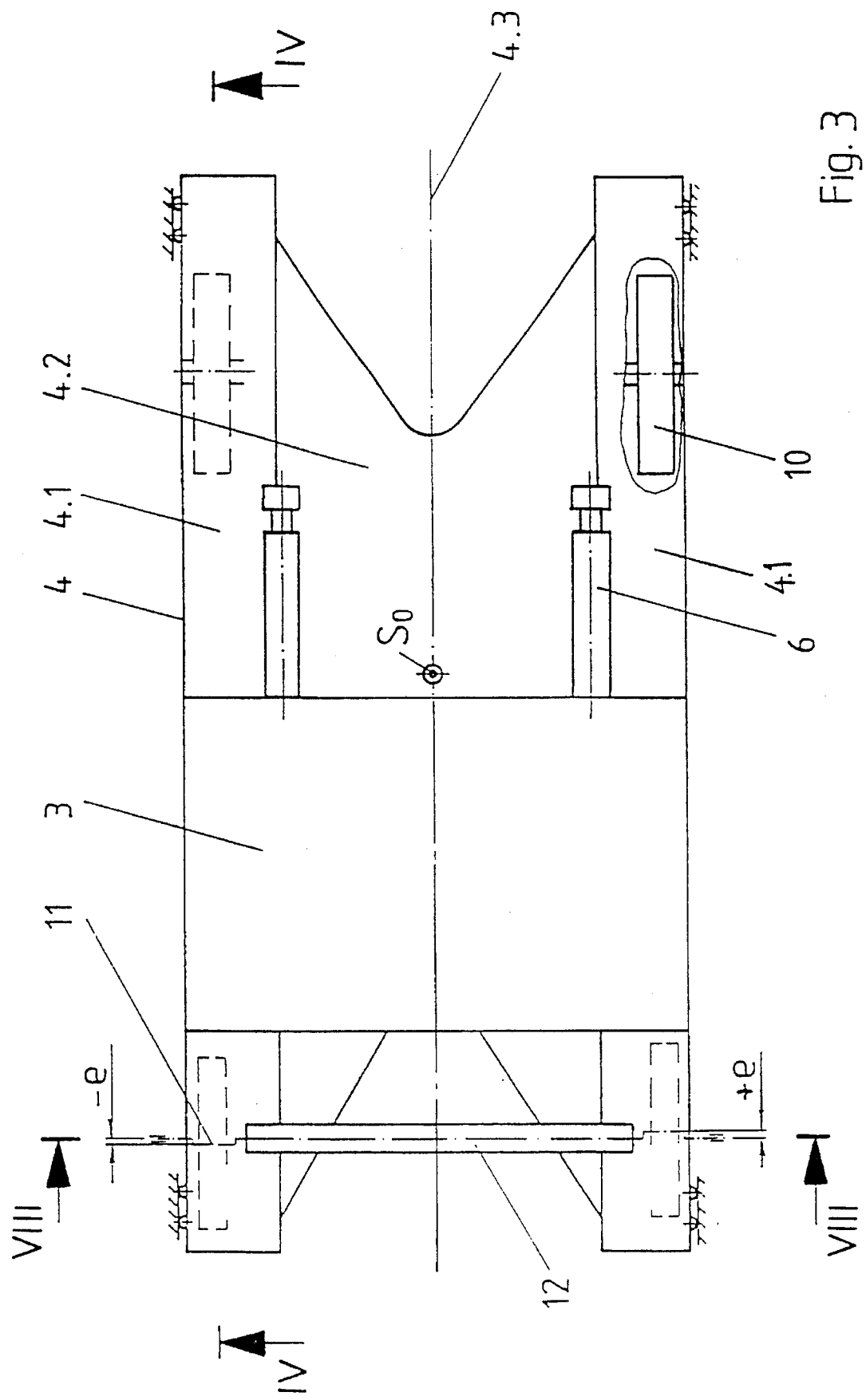
FIG. 3 is a top view of the traveling chuck and carriage.
Figure 4:
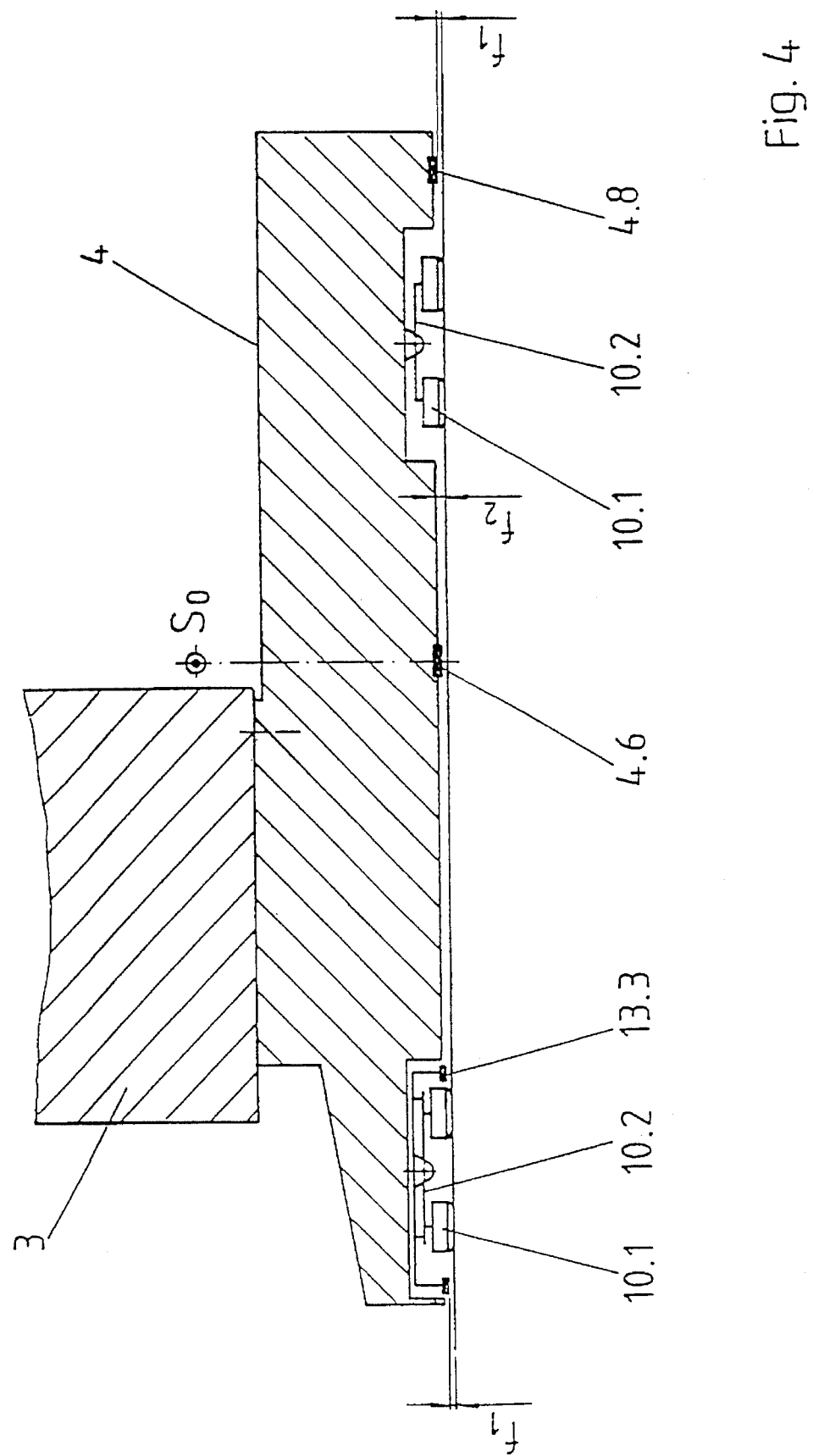
FIG. 4 is a schematic illustration of the carriage along the line IV—IV in FIG. 3.
Figure 5:
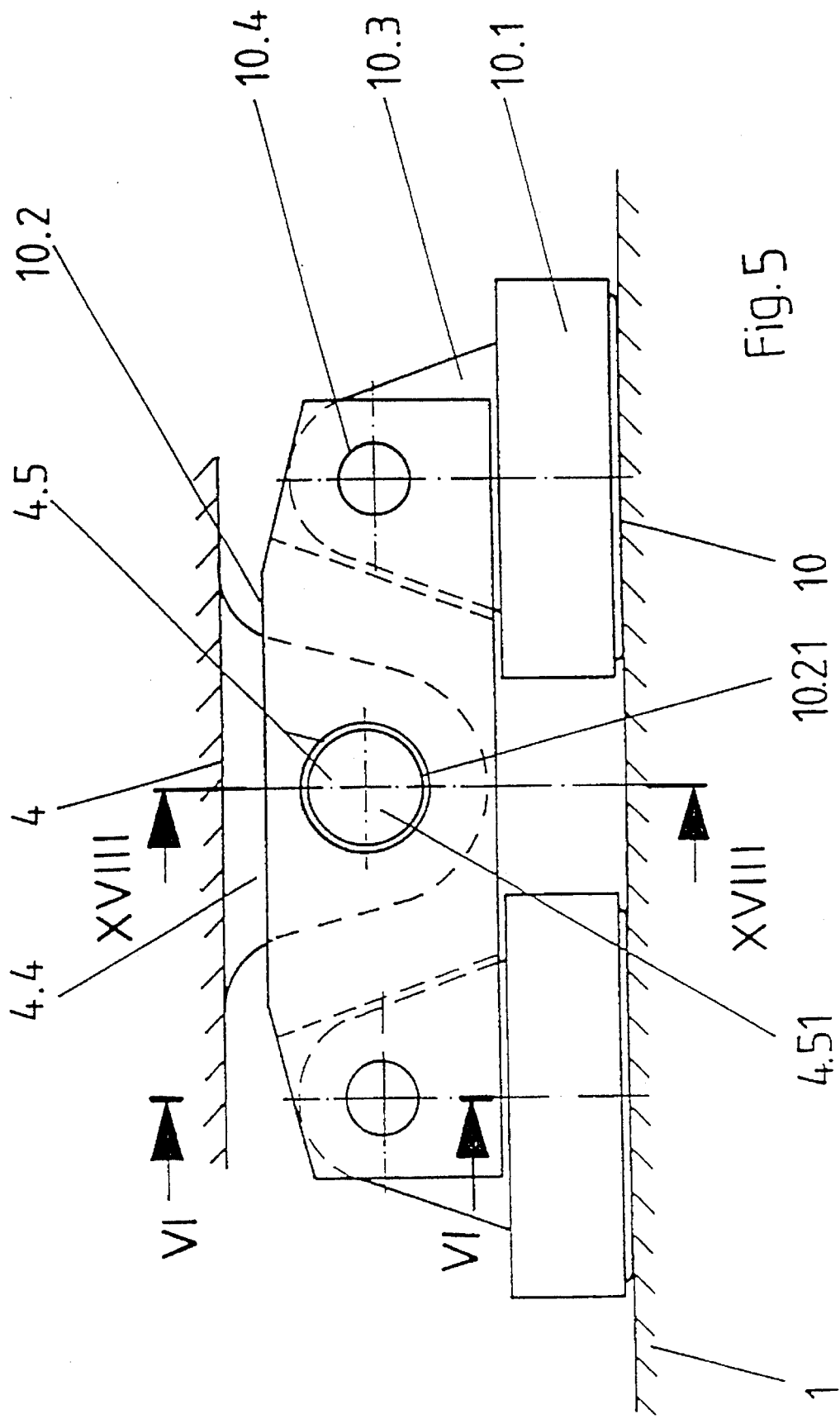
FIG. 5 is a detailed view of the forward rocking-shoe suspension crossarm with two rocking shoes on the carriage facing the stationary chuck.
Figure 6:
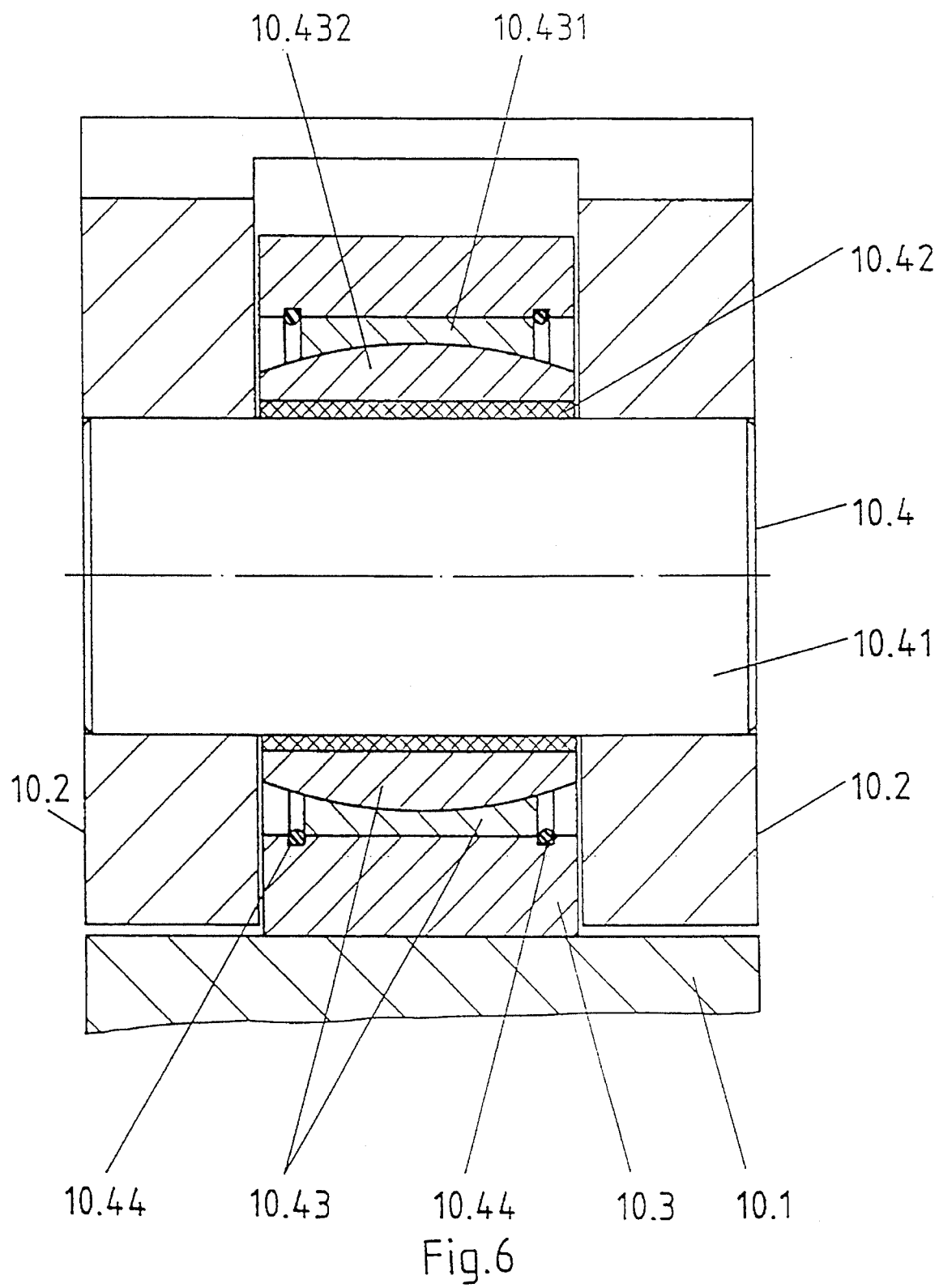
FIG. 6 is a section through the bearing site of a rocking shoe along the line VI—VI in FIG. 5.

FIG. 4 is a sectional side view along the line IV—IV in FIG. 3 of traveling-chuck carriage 4 as viewed from the front, schematically illustrating traveling chuck 3 without the mold half 5 and with rocking-shoe holders 10 at the corners. It will be evident from FIG. 3 that the center of gravity $S_0$ of the mass being displaced is located along the longitudinal central axis 4.3 of carriage 4 between alignment poles 6. It is accordingly evident that forward rocking-shoe holders 10, 14 must accommodate the heaviest load during every illustrated operating phase. As shown in FIGS. 4, 5, and 6, the rocking-shoe holders 10 comprise in-themselves rocking shoes 10.1 preferably pivoting in tandem and in rows in rocking-shoe suspension crossarms 10.2. There are pressure-accommodation disks 4.8 on the bottom of the runners 4.1 on traveling-chuck carriage 4 and below the center of gravity $S_0$ of the mass being displaced. The lower surface of each disk is a distance $f_1$ above the upper surface of base 1. German Patent Document P 4 425 092.4-16 discloses how the distance between the surface of the roller and the pressure-accommodation plates on the bottom of traveling-chuck carriage runners 4.1 is established.

Figure 7:
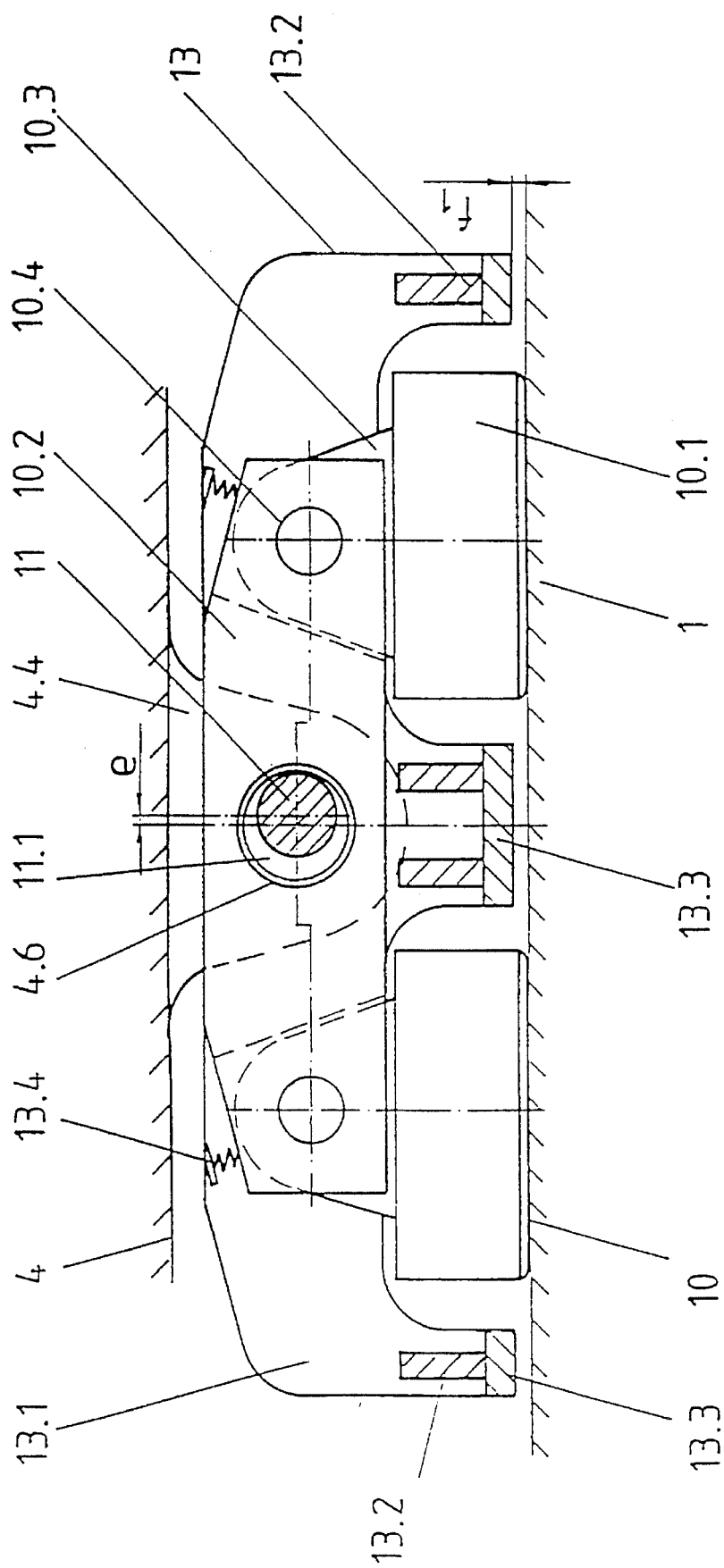
FIG. 7 illustrates a rear crossarm with a carriage-supporting frame for two rocking shoes on the traveling-chuck carriage associated with the rear of the traveling chuck.

FIG. 5 illustrates one of the forward rocking-shoe suspension crossarms 10.2 facing stationary molding-tool chuck 2. FIG. 7 illustrates one of the crossarms 10.2 on the rear of traveling molding-tool chuck 3 showing only a part of traveling-chuck carriage 4.

The height at the front of traveling tool-chuck carriage 4 near the center of gravity $S_0$ of the mass being displaced must be maintained as constant and stable as possible. An almost constant position is achieved in that the rocking-shoe suspension crossarms 10.2 on the front of carriage 4 pivot immediately and directly at the midpoint in a friction bearing 4.5 located on the carriage at a bearing site 4.4. Friction bearing 4.5 consists of a bolt 4.51 that extends tightly through bearing site 4.4 and loosely through a bushing 10.21 fastened to crossarm 10.2. The rows of rocking shoes 10.1 are accommodated in special friction bearings 10.4 at the ends of crossarms 10.2. There is for this purpose a bearing block 10.3 on the top of each rocking shoe 10.1. Bearing block 10.3 and rocking shoe 10.1 pivot longitudinally and transversely at each end of a crossarm 10.2.

FIG. 6 is a larger scale section along the line VI—VI in FIG. 5 illustrating the details of the friction bearing. Friction bearing 10.4 includes a bolt 10.41 that fits tightly in rocking-shoe suspension crossarm 10.2. There is a calotte joint 10.43 at the midpoint of a bushing 10.42 on bolt 10.41. Calotte joint 10.43 comprises an outer half 10.431 with a concave inner surface surrounding an inner half 10.432 with a convex outer surface. Calotte joint 10.43 is accommodated in the bearing block 10.3 on rocking shoe 10.1. This system of suspending rocking shoe 10.1 in crossarm 10.2 results in longitudinal and transverse elasticity that automatically compensates for irregularities in two directions and prevents any edge-to-edge pressure. Outer calotte-joint half 10.431 is axially secured by lock rings 10.44.

One of the two rocking-shoe holders 10 at the rear of traveling-chuck carriage 4 is illustrated in FIG. 7. It also includes rows of rocking shoes 10.1 in tandem. These shoes 10.1 as well are suspended in friction bearings 10.4 in the form of calotte joints 10.43 at the ends of rocking-shoe suspension crossarms 10.2.

As shown in FIGS. 3, 7, 8 and 9, each rear rocking-shoe suspension crossarm 10.2 is mounted on an eccentric section 11.1 of a separate shaft 11. As shown in the top view of FIG. 3 and the sectional views of FIGS. 8 and 9, the two shafts are rigidly connected by a torsion rod 12. The eccentricity e of one shaft opposes the eccentricity -e of the other along the horizontal plane. The non-eccentric section 11.2 of each shaft 11 faces the longitudinal central axis 4.3 of carriage 4. Torsion rod 12 extends between the facing ends of non-eccentric sections 11.2. FIGS. 10 and 11 are detailed views of the rigid joint. There is an entrainment contour 11.3, which preferably has the shape of an involute, at the end of each non-eccentric section 11.2 of shaft 11 facing the longitudinal central axis 4.3 of traveling-chuck carriage 4. Entrainment contour 11.3 merges into a flange 11.4 which has an involute-hub contour. Torsion rod 12 is hollow and has a flange 12.1 at each end. Flanges 11.4 and 12.1 rest against each other and are secured together non-rotating by pins 12.3 and screws 12.2.

Figure 9:
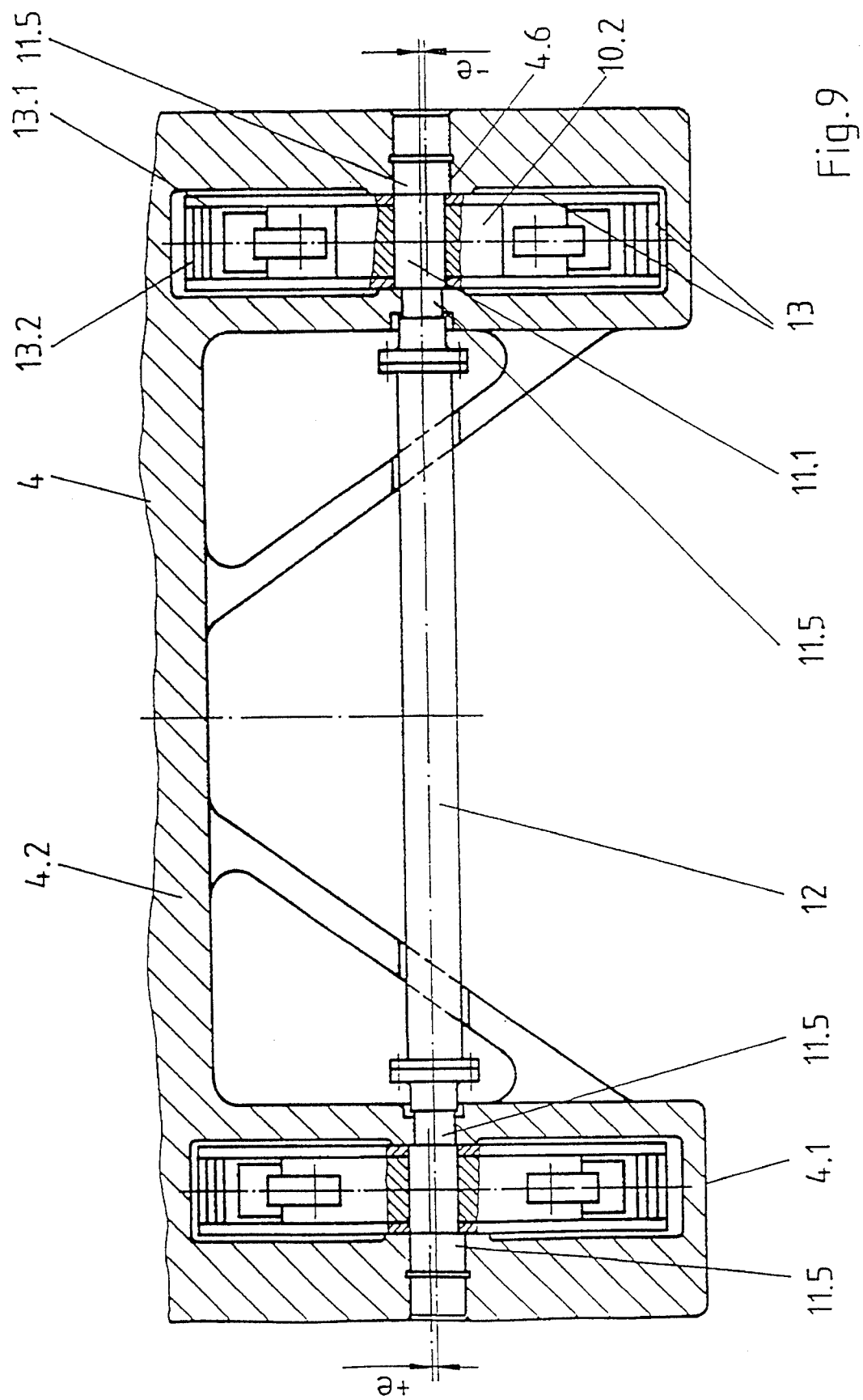
FIG. 9 is a horizontal section through the traveling-chuck carriage bearing sites along the line IX—IX in FIG. 8.
Figure 17:
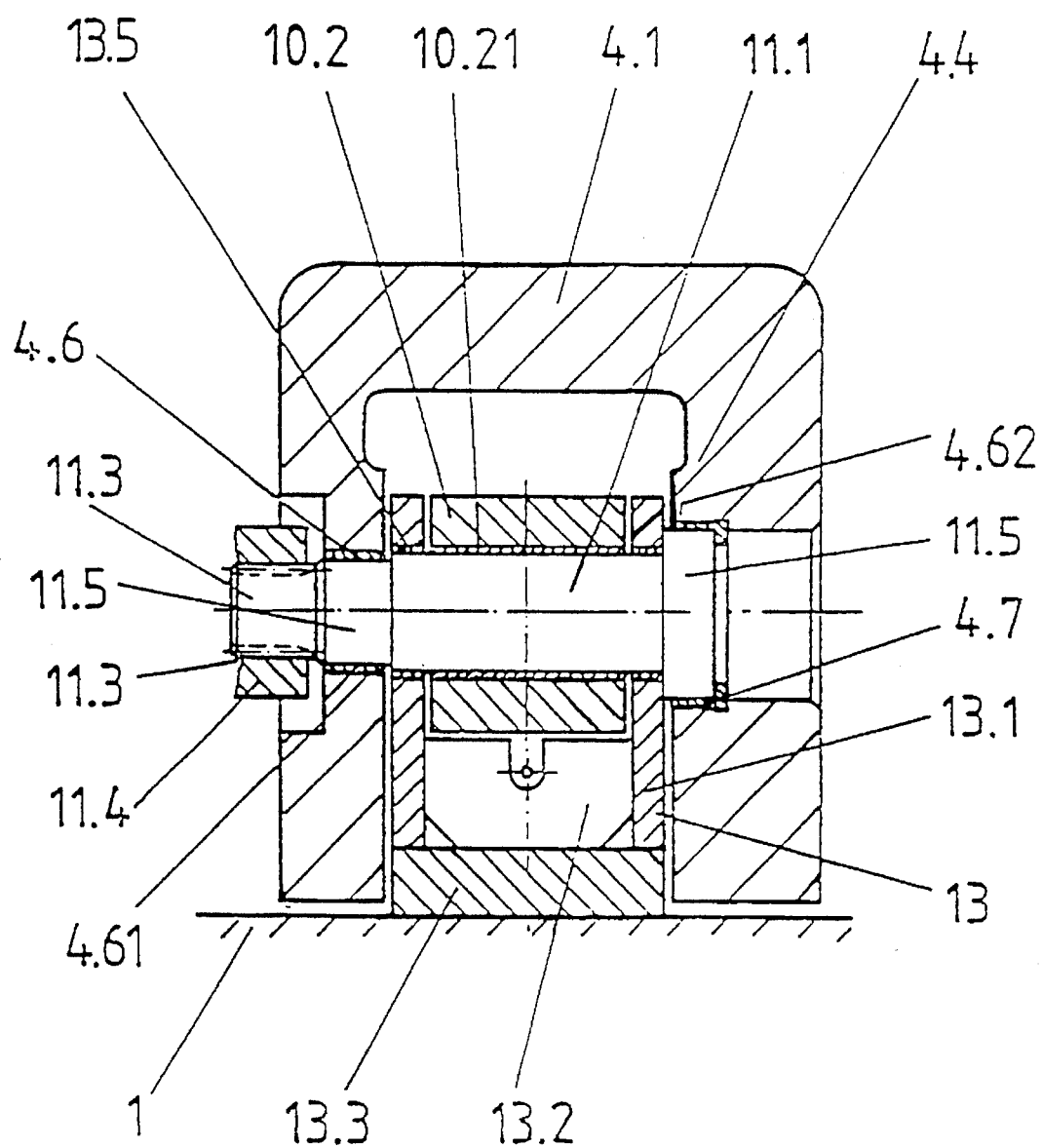
FIG. 17 is a larger-scale rendering of the detail Z in FIG. 8.
Figure 18:
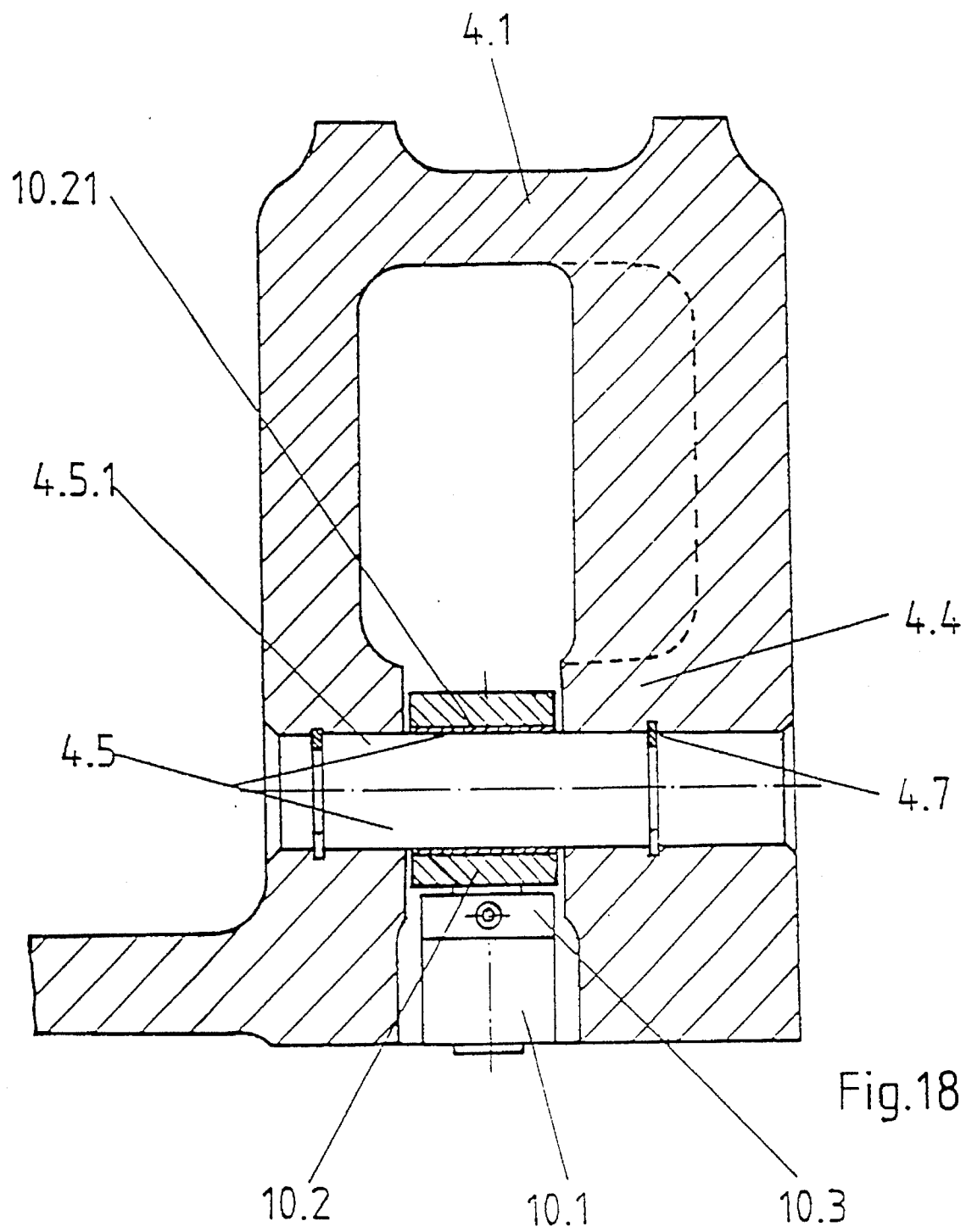
FIG. 18 is a vertical section through the bearing site 4.5 along the line XVIII—XVIII in FIG. 5.

As will be evident from FIGS. 9 and 17, the non-eccentric section 11.5 directly adjacent to the eccentric section 11.1 of each shaft 11 rotates in a friction bearing 4.6. Each friction bearing 4.6 consists of the non-eccentric section 11.5 of a shaft 11 along with bushings 4.61 and 4.62 secured tight in a bearing site 4.4 on traveling-chuck carriage 4. Also on eccentric section 11.1 on each side of rocking-shoe suspension crossarm 10.2 is a frame 13 that supports carriage 4 during the phase of the operation when the load is heaviest.

Figure 8:
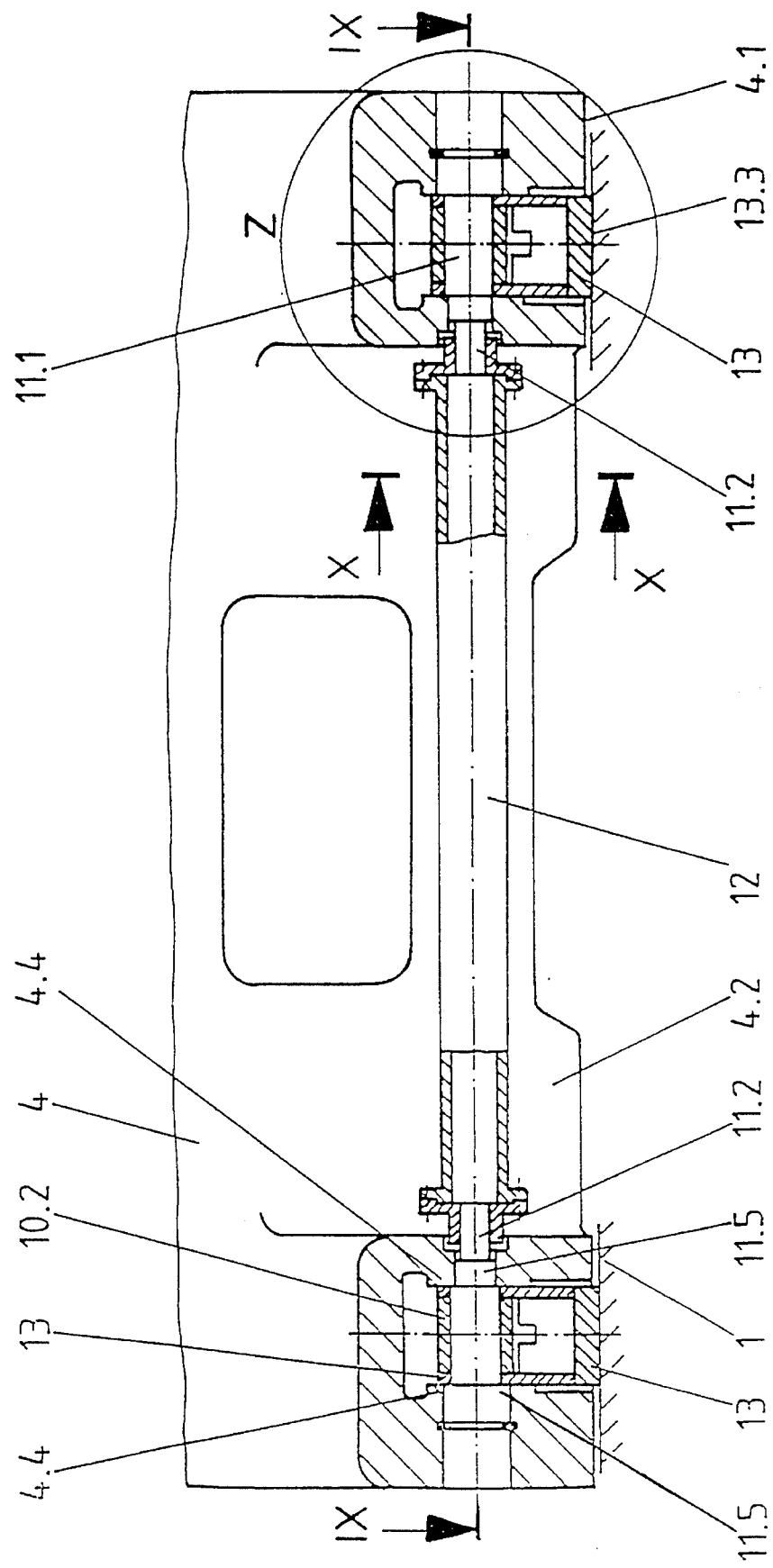
FIG. 8 is a vertical section through the traveling-chuck carriage bearing sites on the rear of the traveling chuck along the line VIII—VIII in FIG. 3.

The rocking shoes 10.1 are simultaneously relieved as will be specified hereinafter. The carriage-supporting frame 13 illustrated in detail Z of FIG. 8 is illustrated in larger scale in FIG. 13.

Referring to FIG. 7, each carriage-supporting frame 13 consists of two sheet-metal sides 13.1 rigidly attached together by sheet-metal webs 13.2 at each end and at the middle. Secured to the bottom of carriage-supporting frame 13 are pressure-accommodation disks 13.3. Compression springs 13.4 are positioned between rocking-shoe suspension crossarm 10.2 and carriage-supporting frame 13. Springs 13.4 ensure maintenance of equilibrium while the displaced mass is being accelerated or decelerated. It will also be evident from FIG. 17 that shaft 11 is prevented from displacing axially along the outside of carriage runners 4.1 by a lock ring 4.7. Carriage-supporting frame 13 and crossarms 10.2 are accommodated in bushings 10.21, 13.5 on eccentric section 11.1. The rocking shoes 10.1 at each end of crossarm 10.2 are hidden in this sectional view by the carriage-supporting frame 13 resting on base 1.

FIGS. 12 and 13 illustrate one of the forward and rear rocking-shoe holders 14 in another embodiment of the present invention intended for lighter static and dynamic loads on carriage 4. Rocking-shoe holder 14 includes a single rocking shoe 14.1 suspended in a rocking-shoe suspension crossarm 14.2 Forward rocking shoe 14.1 is secured to the bottom of a bearing block 14.3. Each of the two outer surfaces of bearing block 14.3 is accommodated in a friction bearing 14.4 in crossarm 14.2. Friction bearings 14.4 are similar to the friction bearing 10.4 specified with reference to FIG. 6, even incorporating the calotte joints. Crossarms 14.2 are also as hereintofore specified accommodated in friction bearings 4.5 at bearing sites 4.4 on traveling-chuck carriage 4.

The position of the rear rocking shoe 14.1 on traveling-chuck carriage 4 differs from that of the forward shoe in that the rocking-shoe suspension crossarm 14.2 rotates as in the tandem system on the eccentric section 11.1 of shaft 11 while carriage-supporting frame 15 rotates in a bushing 15.5 adjacent to the eccentric section, as described with reference to FIGS. 7, 8, and 9. Carriage-supporting frame 15 also consists of sheet-metal sides 15.1 connected at the ends by sheet-metal webs 15.2 with pressure-accommodation disks 15.3 on the bottom.

Carriage-supporting frame 15 is here similarly maintained in equilibrium by compression springs 15.4 between it and rocking-shoe suspension crossarm 14.2 while traveling-chuck carriage 4 is being accelerated or decelerated.

Figure 15:
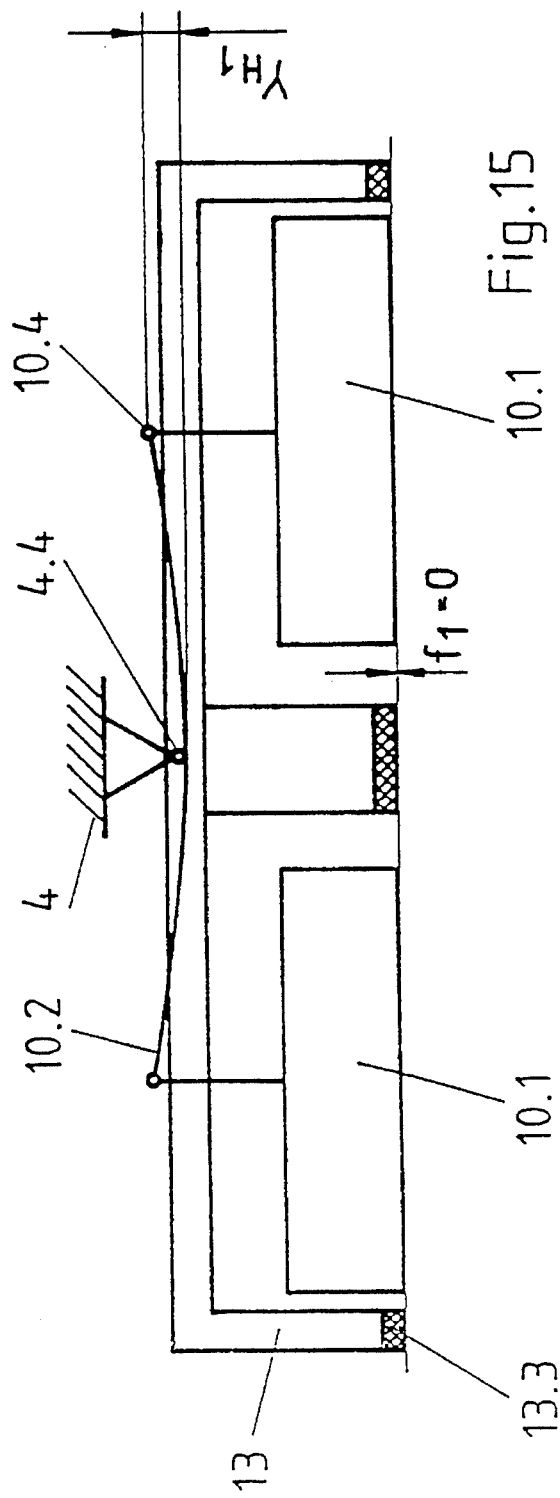
FIG. 15 illustrates loads on the rear rocking-shoe holder with the molding tool tensioned.
Figure 16:
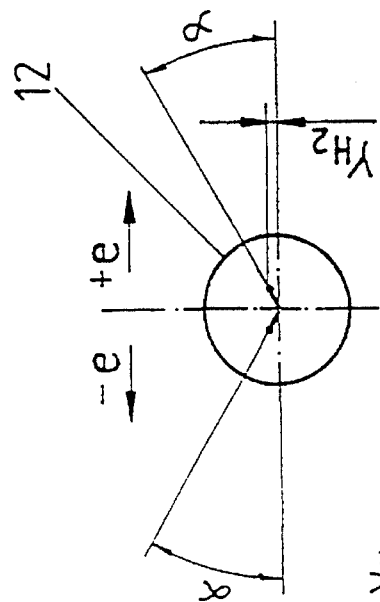
FIG. 16 illustrates deflection due to torque on the torsion rod.

The operation of the present invention with its in-tandem rocking-shoe suspension crossarms 10.2 will now be described. Since maximal irregularity is present even while traveling-chuck carriage 4 is mounted on base 1, only one of the two rocking-shoe holders 10 will be in contact with the upper surface of base 1 from the rear end of the carriage. Torsion rod 12 will accordingly begin to rotate unimpeded in friction bearings 4.6. One crossarm 10.2 will be raised half the height of the irregularity while the crossarm on the other and unaffected side of carriage 4 will be lowered to the same extent. The weight will accordingly be fully balanced due to the transverse rotation of all calotte joints 10.43. To ensure that rocking-shoe holder 10 remains in operation during the weight-compensation displacement, carriage-supporting frame 13 is also mounted on eccentric section 11.1, as shown in FIG. 7, ensuring that the play $f_1$ between the sole of rocking shoe 10.1 and the surface where pressure-accommodation disks 13.3 contact the frame remains constant. To prevent the pressure-accommodation disks 13.3 on carriage-supporting frame 13 from contacting the base while molding-tool chuck 3 is traveling on carriage 4 along with its half of tool 5, crossarm 10.2 is provided with compression springs 13.4. Springs 13.4 accommodate the tilting moment deriving from the action of acceleration and deceleration on carriage-supporting frame 13. Forward crossarms 10.2 will be elastically bent by a distance of $Y_v$ as schematically shown in FIGS. 4 and 14, while the mechanism is in the mold-open position illustrated in FIG. 1 and rapid-action cylinders 8 are opening or closing the mold. Since as shown in FIG. 4 there will still be enough additional play $f_1$ between pressure-accommodation accommodation disks 4.8 and base 1, rocking shoe 10.1 will still be able to rock. As shown in FIG. 15, rear rocking shoes 10.1 will not be subjected to as much weight as the forward shoes due to the distribution of the load exerted by the displaced mass on traveling-chuck carriage 4. During this phase of operation, rear rocking-shoe suspension crossarms 10.2 will be bent by a distance $Y_{H1}$ less than that of the forward crossarms. Superimposed thereon is a farther lowering of the rear crossarms due to elastic torsion of torsion rod 12 by an amount $Y_{H2}$ as shown in FIG. 16. The sum $Y_{H1}+Y_{H2}$ represents the overall flection of the rear crossarms, which equals the flection $Y_V$ of the forward crossarms.

The load-balancing mechanism in accordance with the present invention in no way affects the slope of traveling molding-tool chuck 3 during the two aforesaid operating phases, mold-open and chuck-traveling. Enough play $f_1$ still remains between the pressure-accommodation disks 13.3 in rear rocking-shoe holder 10 and the upper surface of base 1 as illustrated in FIG. 4 to allow rear rocking shoe 10.1 to rock. When not subject to load, the non-eccentric bearing sites and eccentric pivoting sites of rocking-shoe suspension crossarms 10.2 rest against torsion rod 12 in a straight line. A load on rocking-shoe suspension crossarms 10.2 will twist torsion rod 12, and the three aforesaid points will be located substantially along a bent line. The angle of torsion of rod 12 is α as shown in FIG. 16. Superimposed on this torsion will be a rotation on the part of the rod for the purpose of weight compensation deriving from the existing irregularities or non-uniform distribution of force.

It is only while static tension is being exerted on tool 5 with the mold closed as shown in FIG. 2 that additional static forces occur capable of exceeding by approximately 50% those that prevail during the operation. While these forces occur, rocking-shoe suspension crossarms 10.2 compress along with rocking shoes 10.1 until residual play $f_1$ is equal to zero, as shown in FIGS. 14 and 15. The result is precise limitation of the load with respect to rocking shoe 10.1 in that pressure-accommodation disks 4.8 and 13.3 rest against the upper surface of base 1 and accommodate the additional forces occurring there. It is for these reasons that the disks do not slide, but execute only a strictly static function. The pressure-accommodation disks 13.3 in the two rear rocking-shoe holders are on the bottom of carriage-supporting frame 13. Frame 13 is rigid and rotates along with rocking-shoe suspension crossarm 10.2 on the eccentric section 11.1 of shaft 11. However, during the phases of operation that involve lighter loads, the torsion on rod 12 plus the flection of rocking-shoe suspension crossarms 10.2 equal the flection of the forward crossarms alone. The result is that traveling-chuck carriage 4 remains horizontal during phases when rocking-shoe holder 10 is in operation. FIG. 4 also shows a play $f_2$ which represents the distance between the lower edge of carriage 4 and the upper surface of base 1. Play $f_2$ dictates the capacity of the rocking-shoe holder to accommodate maximal expected deviations in the mass and position of the upper surface of base 1 and of the bearing sites in carriage 4.

Thus, while there have been shown and described and pointed out fundamental novel features of the invention as applied to a preferred embodiment thereof, it will be understood that various omissions and substitutions and changes in the form and details of the disclosed apparatus, and in its operation, may be made by those skilled in the art without departing from the spirit of the invention. It is the intention, therefore, to be limited only as indicated by the scope of the claims appended hereto. It is also to be understood that the drawings are not necessarily drawn to scale but that they are merely conceptual in nature.

What is claimed is:

1. An apparatus for closing a mold having two sections in a plastic injection-molding machine comprising:

a base (1);

a carriage (4);

a first chuck (2) sized so as to accommodate one section of the mold, said first chuck being fixedly mounted to said base (1) and having at least two alignment holes passing at least partially therethrough;

a second chuck (3) sized so as to accommodate the second section of the mold;

at least two alignment poles (6) longitudinally mounted to said second chuck (3) so that said alignment poles (6) are substantially parallel to one another and directed toward and aligned with the alignment holes in said first chuck (2);

a mounting means for mounting said second chuck (3) to said carriage (4);

a forward support means for slidably supporting said carriage (4) on said base (1), said forward support means supporting a forward end of said carriage (4) most proximate to said first chuck (2) at a minimum of two points, said forward support means comprising:

at least two forward bearing sites (4.4) fixedly mounted proximate to the forward end of said carriage (4) and proximate to forward corners of said carriage (4);

a forward suspension crossarm (10.2, 14.2) mounted to each of said forward bearing sites (4.4) so that said forward suspension crossarms are capable of pivoting longitudinally in a direction substantially parallel to said alignment poles (6); and a forward rocking shoe (10.1, 14.1) mounted to each of said forward suspension crossarms (10.2, 14.2), said forward rocking shoes (10.1, 14.1) riding on said base (10); and a rear support means for slidably supporting said carriage on said base (1), said rear support means supporting a rear end of said carriage (4) most remote from said first chuck (2) at a minimum of two points, said rear support means comprising:

at least two rear bearing sites (4.4) fixedly mounted proximate to the rear end of said carriage (4) and proximate to rear corners of said carriage (4);

at least two shafts (11) each having an eccentric portion (11.1) and a non-eccentric portion (11.2), the non-eccentric portion (11.2) of each shaft extending transversely through and being rotatably mounted in a respective bearing site (4.4), the non-eccentric portions (11.2) of said shafts (11) being connected to one another by a torsion rod (12) so that the eccentricity of one of said eccentric portions (11.1) opposes the eccentricity of another of said eccentric portions (11.1);

at least two rear suspension crossarms (10.2, 14.2) rotatably mounted transversely to respective eccentric portions (11.1) of said shafts (11) so that said rear suspension crossarms are capable of pivoting longitudinally in a direction substantially parallel to said alignment poles (6); and a rear rocking shoe (10.1, 14.1) mounted to each of said rear suspension crossarms (10.2, 14.2), said rear rocking shoes (10.1, 14.1) riding on said base (10).

2. The apparatus of claim 1, further comprising mold locking-and-unlocking cylinders (9) for maintaining said first and second chucks (2, 3) in a substantially closed position under pressure.

3. The apparatus of claim 1, further comprising a cylinder (8) for moving said carriage (4) along said base (1).

4. The apparatus of claim 1, wherein the alignment holes in said first chuck (2) extend through said first chuck (2) and wherein said alignment poles (6) have a length so as to extend through said first chuck (2).

5. The apparatus of claim 1, wherein the forward and rear suspension crossarms (10.2, 14.2) pivot about midsections thereof.

6. The apparatus of claim 1, further comprising pressure-accommodation disks (13.3, 15.3) resiliently mounted to said rear suspension crossarms (10.2, 14.2) so as to contact said base (1) when said carriage (4) is accelerated or decelerated along said base (1).

7. The apparatus of claim 1, further comprising pressure-accommodation disks (4.6, 4.8) mounted to said carriage (4) proximate to said base (1).

8. The apparatus of claim 7, wherein at least one of said pressure-accommodation disks (4.6) is positioned proximate to the center of gravity of said apparatus and at least one of said pressure-accommodation disks (4.8) is positioned proximate to the forward end of the carriage (4).

9. The apparatus of claim 1, wherein each of said rocking shoes (10.1, 14.1) are mounted to respective suspension crossarms (10.2, 14.2) so that said rocking shoes (10.1, 14.1) are capable of pivoting transversely in a direction substantially perpendicular to said alignment poles (6).

10. The apparatus of claim 9, wherein each of said rocking shoes (10.1, 14.1) is mounted to a respective suspension crossarm (10.2, 14.2) in a calotte joint.

11. The apparatus of claim 1, wherein one rocking shoe (14.1) is mounted to each suspension crossarm (14.2).

12. The apparatus of claim 1, wherein at least two rocking shoes (14.1) are mounted to each suspension crossarm (14.2).

13. The apparatus of claim 1, further comprising an adjusting means for adjusting the position and alignment of said alignment poles (6).

* * * * *